(12) United States Patent
Okada (10) Patent No.: US 10,769,876 B2
(45) Date of Patent: *Sep. 8, 2020

(54) VEHICULAR ELECTRONIC KEY SYSTEM AND METHOD OF CONTROLLING ELECTRONIC KEY

(71) Applicant: TOYOTA JIDOSHA KABUSHIKI KAISHA, Toyota-shi, Aichi-ken (JP)

(72) Inventor: Hiroki Okada, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/275,836

(22) Filed: Feb. 14, 2019

(65) Prior Publication Data

US 2019/0180536 A1 Jun. 13, 2019

Related U.S. Application Data

(63) Continuation of application No. 16/001,434, filed on Jun. 6, 2018, now Pat. No. 10,249,117.

(30) Foreign Application Priority Data

Jul. 25, 2017 (JP) ................................ 2017-143668

(51) Int. Cl.
*G07C 9/28* (2020.01)
*B60R 25/24* (2013.01)
(Continued)

(52) U.S. Cl.
CPC ............... *G07C 9/28* (2020.01); *B60R 25/24* (2013.01); *B60R 25/40* (2013.01);
(Continued)

(58) Field of Classification Search
CPC ............ G07C 9/00111; G07C 9/00119; G07C 2009/00261; G07C 2009/00317;
(Continued)

(56) References Cited

U.S. PATENT DOCUMENTS

2006/0145811 A1* 7/2006 Nantz ................ G07C 9/00174
340/5.72
2011/0257817 A1* 10/2011 Tieman ................... B60R 25/24
701/2

(Continued)

FOREIGN PATENT DOCUMENTS

CN 102555991 A 7/2012
CN 104442702 A 3/2015
(Continued)

OTHER PUBLICATIONS

Nov. 16, 2018 Notice of Allowance issued in U.S. Appl. No. 16/001,434.

*Primary Examiner* — Emily C Terrell
(74) *Attorney, Agent, or Firm* — Oliff PLC (57) ABSTRACT

A vehicular electronic key system includes an electronic key and a wireless communication device. The electronic key includes a first communication unit, a second communication unit, and a first controller that switches an operating state between an ON state where a function of the first communication unit is operated, and an OFF state where the function of the first communication unit is at least partially stopped, based on a result of communication of the second communication unit with the wireless communication device. The wireless communication device includes a third communication unit, and a second controller. The first controller switches the operating state when the first controller detects that the electronic key has been moved by a predetermined distance or longer outside a vehicle based on (Continued)

at least a result of communication of a predetermined signal by the second communication unit.

13 Claims, 5 Drawing Sheets

(51) Int. Cl.
*G07C 9/00* (2020.01)
*B60R 25/40* (2013.01)
(52) U.S. Cl.
CPC ..... *G07C 9/00309* (2013.01); *G07C 9/00944* (2013.01); *G07C 2009/0038* (2013.01); *G07C 2009/00587* (2013.01); *G07C 2009/00793* (2013.01)
(58) Field of Classification Search
CPC .. G07C 2009/00365; G07C 2009/0038; G07C 2009/00587; B60R 25/406; B60R 25/40
USPC ...... 340/5.61, 426.13, 426.16, 426.17, 425.5
See application file for complete search history.

(56) References Cited

U.S. PATENT DOCUMENTS

| | | |
|---|---|---|
| 2012/0139691 A1 | 6/2012 | Mori |
| 2014/0062655 A1 | 3/2014 | Colburn |
| 2016/0063784 A1 | 3/2016 | Murakami et al. |
| 2016/0148450 A1* | 5/2016 | Ohshima ............ B62D 15/0285 340/5.61 |
| 2016/0318475 A1* | 11/2016 | Honkanen .......... G07C 9/00182 |
| 2017/0160786 A1* | 6/2017 | Ji ....................... G07C 9/00309 |
| 2018/0053416 A1 | 2/2018 | Sanji et al. |

FOREIGN PATENT DOCUMENTS

| | | |
|---|---|---|
| EP | 2464156 A1 | 6/2012 |
| JP | H09-004292 A | 1/1997 |
| JP | 2012-227586 A | 11/2012 |
| JP | 2014-205978 A | 10/2014 |
| JP | 2017-047867 A | 3/2017 |

* cited by examiner

VEHICULAR ELECTRONIC KEY SYSTEM AND METHOD OF CONTROLLING ELECTRONIC KEY

INCORPORATION BY REFERENCE

This is a Continuation of application Ser. No. 16/001,434 filed Jun. 6, 2018, which in turn claims the benefit of Japanese Patent Application No. 2017-143668 filed on Jul. 25, 2017. The disclosure of the prior applications is hereby incorporated by reference herein in its entirety.

BACKGROUND

1. Technical Field

The present disclosure relates to a vehicular electronic key system and a method of controlling an electronic key.

2. Description of Related Art

It is proposed to provide a vehicular electronic key with a function of stopping at least a part of a function of performing wireless communication with a vehicle and the like.

Japanese Unexamined Patent Application Publication No. 2014-205978 (JP 2014-205978 A) discloses saving electric power by disconnecting electrical conduction between a battery and an electronic circuit when a controller of a smart entry portable device (electronic key) detects the capacity of the battery being equal to or lower than a reference value.

Japanese Unexamined Patent Application Publication No. 2012-227586 (JP 2012-227586 A) discloses saving electric power in a case where communication is assumed not to be needed such that a controller of a portable wireless communication device (electronic key) causes electric power to be supplied from a battery to a wireless receiver while the controller determines that vibrations are transmitted based on an output voltage of a vibration power generation device, and the controller stops the supply of electric power when the controller determines that vibrations are not transmitted based on the output voltage of the vibration power generation device.

Japanese Unexamined Patent Application Publication No. 2017-47867 (JP 2017-47867 A) discloses transmitting a wireless signal instructing a portable device (electronic key) to turn ON or OFF its wireless signal transmission function for a vehicle, from a portable wireless communication terminal device such as a smartphone to the portable device using short-range wireless communication. A user can control whether to turn ON or OFF the communication function between the electronic key and the vehicle by operating the smartphone or the like without pulling out the electronic key accommodated in a bag or the like, and the security can be improved.

SUMMARY

In JP 2017-47867 A, for example, after the user stops the vehicle, steps out of the vehicle, and locks the door, in a case where the user forgets to turn OFF the communication function between the electronic key and the vehicle, the communication function of the electronic key remains ON, and an expected effect is not achieved.

The disclosure provides a vehicular electronic key system and a method of controlling an electronic key that can change a restricted state of a communication function between an electronic key and a vehicle independently of an operation by a user in the vehicular electronic key system in which the communication function can be restricted using a wireless communication device.

A first aspect of the disclosure relates to a vehicular electronic key system that includes an electronic key and a wireless communication device. The electronic key includes a first communication unit configured to perform wireless communication with a vehicle, a second communication unit configured to perform wireless communication with the wireless communication device, and a first controller configured to switch an operating state between an ON state where a function of the first communication unit is operated, and an OFF state where the function of the first communication unit is at least partially stopped, based on a result of communication of the second communication unit with the wireless communication device. The wireless communication device includes a third communication unit configured to perform wireless communication with the second communication unit, and a second controller configured to cause the third communication unit to transmit a predetermined signal. The first controller is configured to switch the operating state when the first controller detects that the electronic key has been moved by a predetermined distance or longer outside the vehicle based on at least a result of communication of the predetermined signal by the second communication unit.

Accordingly, communication between the electronic key and the vehicle can be restricted based on the movement of a user outside the vehicle without an operation from the user carrying the electronic key, and convenience and security can be further improved.

In the vehicular electronic key system according to the first aspect of the disclosure, the wireless communication device may be installed in the vehicle. The first controller of the electronic key and the second controller of the wireless communication device may be configured to respectively control the second communication unit of the electronic key and the third communication unit of the wireless communication device such that the second communication unit of the electronic key and the third communication unit of the wireless communication device perform short-range wireless communication with each other. The first controller may be configured to set the operating state to the OFF state when the second communication unit does not receive the predetermined signal for a predetermined period.

Accordingly, the movement can be detected based on disconnection of the short-range wireless communication, and the communication between the electronic key and the vehicle can be restricted.

In the vehicular electronic key system according to the first aspect of the disclosure, the first controller and the second controller may be configured to respectively control the second communication unit and the third communication unit such that the second communication unit and the third communication unit communicate with each other in accordance with a predetermined short-range wireless communication standard using an electric wave having an intensity of a predetermined value or lower. The first controller and the second controller may be configured to confirm that a connection state between the second communication unit and the third communication unit is maintained by causing the second communication unit and the third communication unit to synchronously or asynchronously transmit and receive the predetermined signal at intervals of a certain period or shorter.

The vehicular electronic key system according to the first aspect of the disclosure may further include an acceleration sensor. The wireless communication device may be a portable wireless communication terminal device that is carried by a user. The second controller of the wireless communication device may be configured to generate a signal including information based on an output of the acceleration sensor as the predetermined signal and cause the third communication unit to transmit the predetermined signal. The first controller of the electronic key may be configured to switch the operating state when the second communication unit receives the predetermined signal.

Accordingly, the movement can be detected using the output of the acceleration sensor, and the communication between the electronic key and the vehicle can be restricted.

In the vehicular electronic key system according to the first aspect of the disclosure, the first controller of the electronic key may be configured to determine whether the user carrying the wireless communication device has walked the predetermined distance or longer based on the information included in the predetermined signal when the second communication unit receives the predetermined signal, and set the operating state to the OFF state when the first controller determines that the user has walked the predetermined distance or longer.

Accordingly, the electronic key can detect the movement using the output of the acceleration sensor, and can restrict the communication between the electronic key and the vehicle.

In the vehicular electronic key system according to the first aspect of the disclosure, the second controller of the wireless communication device may be configured to determine whether the user carrying the wireless communication device has walked the predetermined distance or longer based on the output of the acceleration sensor, and generate a signal indicating a result of determination as the predetermined signal and cause the third communication unit to transmit the predetermined signal when the second controller determines that the user has walked the predetermined distance or longer. The first controller of the electronic key may be configured to set the operating state to the OFF state when the second communication unit receives the predetermined signal.

Accordingly, the wireless communication device can detect the movement using the output of the acceleration sensor, and can restrict the communication between the electronic key and the vehicle.

A second aspect of the disclosure relates to a method of controlling an electronic key. The method is executed by an electronic key and a wireless communication device in a vehicular electronic key system including the electronic key and the wireless communication device. The method includes, by the electronic key, executing wireless communication with a vehicle, executing wireless communication with the wireless communication device, and switching an operating state between an ON state where the wireless communication with the vehicle is executed, and an OFF state where the wireless communication with the vehicle is at least partially stopped, based on a result of communication with the wireless communication device, and by the wireless communication device, executing wireless communication with the electronic key, and transmitting a predetermined signal in the wireless communication with the electronic key. In the executing of the wireless communication with the vehicle, the electronic key switches the operating state when a detection is made that the electronic key has been moved by a predetermined distance or longer outside the vehicle based on at least a result of communication of the predetermined signal in the executing of the wireless communication with the wireless communication device.

Accordingly, as described above, communication between the electronic key and the vehicle can be restricted based on the movement of a user outside the vehicle without an operation from the user carrying the electronic key, and convenience and security can be further improved.

The method according to the second aspect of the disclosure may further include, transmitting a polling signal to the electronic key, by the wireless communication device; and by the electronic key i) resetting a timer and starting a count, transmitting a response signal to the wireless communication device as a response to the polling signal, and setting the operating state to the ON state when the electronic key receives the polling signal, and ii) setting the operating state to the OFF state when the electronic key does not receive the polling signal even when the count exceeds a predetermined value.

The method according to the second aspect of the disclosure may further include, by the wireless communication device, transmitting a signal to the electronic key based on a value of an acceleration sensor that is included in the wireless communication device; by the electronic key, determining whether a user has walked based on the signal; and by the electronic key i) setting the operating state to the OFF state when the electronic key determines that the user has walked, and ii) setting the operating state to the ON state when the electronic key determines that the user has not walked.

The method according to the second aspect of the disclosure may further include, by the wireless communication device, determining whether a user has walked based on a value of an acceleration sensor that is included in the wireless communication device and transmitting a signal to the electronic key when the wireless communication device determines that the user has walked; and by the electronic key, switching the operating state to the OFF state when the electronic key receives the signal.

According to the aspects of the disclosure, it is possible to provide a vehicular electronic key system and a method of controlling an electronic key that can change a restricted state of a communication function for a vehicle independently of an operation by a user.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Overview

In a vehicular electronic key system according to an embodiment of the disclosure, an electronic key includes a first communication unit and a second communication unit. The first communication unit communicates with a vehicle. The second communication unit communicates with a wireless communication device. The electronic key can switch between an OFF state where the function of the first communication unit is at least partially restricted, and an ON state where the function of the first communication unit is not restricted. The wireless communication device and the electronic key switch the first communication unit between the ON state and the OFF state in a predetermined case where the wireless communication device and the electronic key can determine that there is a possibility that the electronic key is moved by a predetermined distance or longer outside the vehicle. Accordingly, communication between the electronic key and the vehicle can be restricted without an operation from a user, and security can be further improved.

Hereinafter, embodiments of the disclosure will be described in detail with reference to the drawings.

First Embodiment

Configuration

Figure 1:
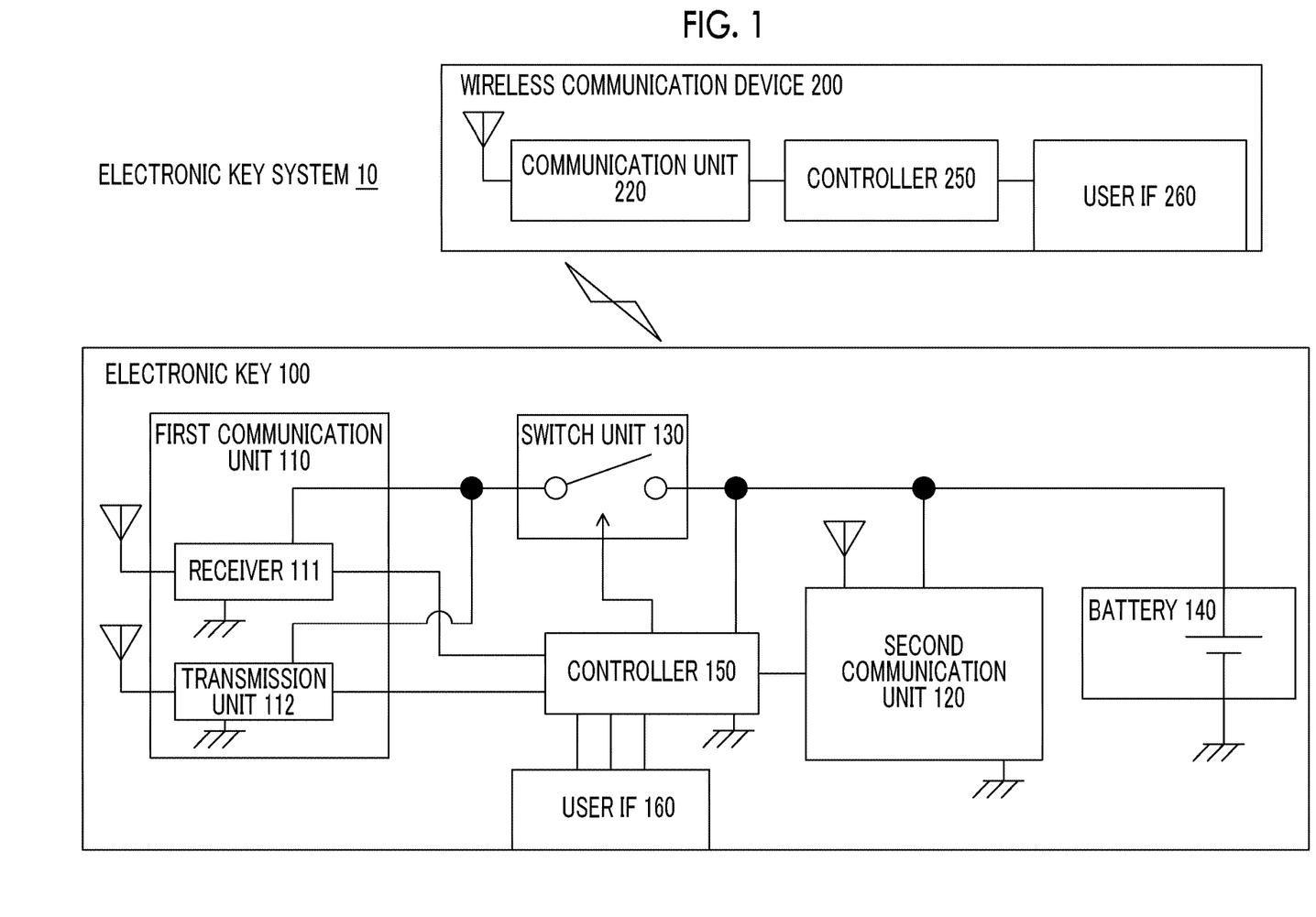
FIG. 1 is a function block diagram of a vehicular electronic key system according to a first embodiment of the disclosure.

FIG. 1 illustrates a function block diagram of a vehicular electronic key system 10 according to the present embodiment. The vehicular electronic key system 10 includes an electronic key 100 and a wireless communication device 200. The electronic key 100 includes a first communication unit 110, a second communication unit 120, a switch unit 130, a controller (first controller) 150, a user interface (IF) 160, and a battery 140 that supplies electric power to each unit.

The wireless communication device 200 includes a communication unit (third communication unit) 220, a user IF 260, and a controller (second controller) 250 that controls each unit. The communication unit 220 performs wireless communication with the second communication unit 120. While the wireless communication device 200 is typically supplied with electric power from an incorporated battery, the wireless communication device 200 may be supplied with electric power from its outside. The user IF 260 is, for example, a touch panel, a display, or a key button. The user IF 260 presents information to the user and receives an operation from the user.

The first communication unit 110 of the electronic key 100 includes a receiver 111 and a transmission unit 112. The receiver 111 receives a wireless signal from the vehicle. The transmission unit 112 transmits a wireless signal to the vehicle. When the first communication unit 110 is present around the vehicle, the first communication unit 110 performs authentication between the electronic key 100 and the vehicle by transmitting and receiving signals to and from the vehicle. The second communication unit 120 performs wireless communication with the communication unit 220 of the wireless communication device 200. The user IF 160 is, for example, a button switch. While the user can execute an operation of locking or unlocking the door of the vehicle by touching the door of the vehicle when the electronic key 100 is authenticated by the vehicle, the user can also execute the operation of locking or unlocking the door of the vehicle by operating the button switch of the electronic key 100. The controller 150 controls the operation of each unit. The switch unit 130 switches an electric power supplying state between an ON state where electric power is supplied to the first communication unit 110, and an OFF state where electric power is not supplied to the first communication unit 110. While the switch unit 130 switches the electric power supplying state for both of the receiver 111 and the transmission unit 112 of the first communication unit 110 in the illustrated example, the switch unit 130 may switch the electric power supplying state for any one of the receiver 111 or the transmission unit 112.

Operation

In the present embodiment, the wireless communication device 200 is installed in the vehicle. In the present embodiment, the electronic key 100 can detect disconnection of wireless communication and control the first communication unit 110 to be turned ON or OFF based on the fact that when the electronic key 100 is carried by the user and moved outside the vehicle, and the distance between the electronic key 100 and the wireless communication device 200 becomes equal to or longer than a predetermined distance, wireless communication is disconnected. For example, the communication unit 220 of the wireless communication device 200 and the second communication unit 120 of the electronic key 100 communicate with each other in accordance with a predetermined short-range wireless communication standard using an electric wave having an intensity of a predetermined value or lower, and perform a process of confirming that the connection state therebetween is maintained by synchronously or asynchronously transmitting and receiving a predetermined signal at intervals of a certain period or shorter.

Figure 2:
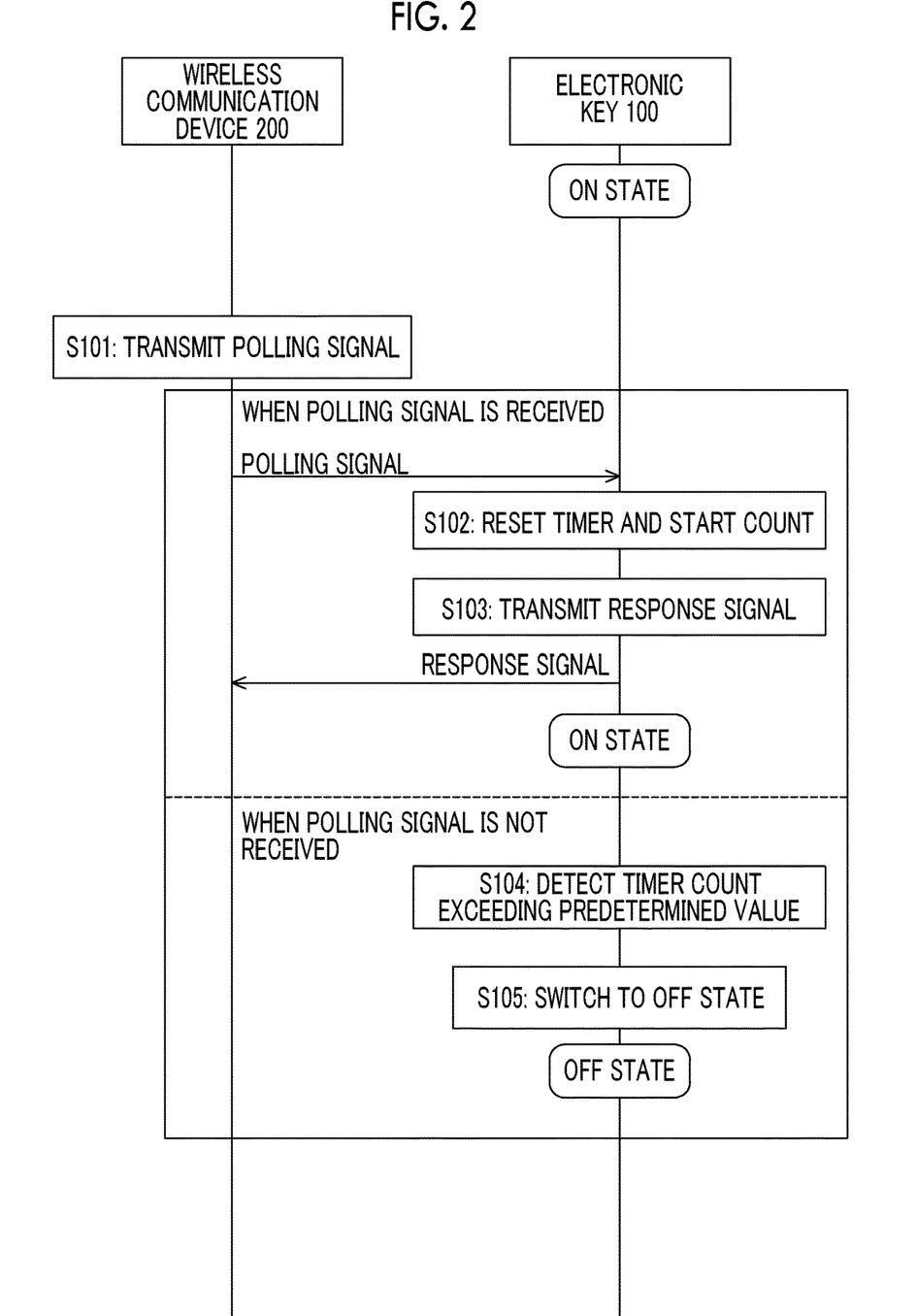
FIG. 2 is an operation sequence diagram of the vehicular electronic key system according to the first embodiment of the disclosure.

FIG. 2 illustrates an example of an operation sequence. Herein, a case is illustrated in which, in a state where the connection state between the wireless communication device 200 and the electronic key 100 is established, communication is disconnected and the first communication unit 110 is switched from the ON state to the OFF state.

Step S101: The controller 250 of the wireless communication device 200 causes the communication unit 220 to transmit a predetermined signal (polling signal).

Step S102: The second communication unit 120 of the electronic key 100 receives the polling signal. The controller 150 of the electronic key 100 resets a timer and starts a count. The process proceeds to step S103.

Step S103: The controller 150 of the electronic key 100 causes the second communication unit 120 to transmit a response signal as a response to the polling signal.

In a case where the distance between the wireless communication device 200 and the electronic key 100 is shorter than a distance reachable by the polling signal, the processes of steps S101 to S103 are repeated.

In a case where the distance between the wireless communication device 200 and the electronic key 100 becomes longer than the distance reachable by the polling signal and the polling signal is not received, the following processes of steps S104 and S105 are performed.

Step S104: When the second communication unit 120 of the electronic key 100 does not receive the polling signal, the timer is not reset, and the count value continues increasing. When the controller 150 of the electronic key 100 detects the timer count exceeding a predetermined value, the controller 150 determines that the connection to the wireless communication device 200 is released, and the process proceeds to step S105.

Step S105: The controller 150 of the electronic key 100 controls the switch unit 130 to set the first communication unit 110 to the OFF state.

While the short-range wireless communication standard is not limited, Bluetooth (registered trademark), for example, can be used. In the example described above, after the user carrying the electronic key 100 steps out of the vehicle where the wireless communication device 200 is installed, when the user moves away from the vehicle by the predetermined distance or longer so that the communication is disconnected, and thus the need for the communication function between the electronic key 100 and the vehicle disappears, the first communication unit 110 of the electronic key 100 can be automatically set to the OFF state from the ON state.

In a case where the electronic key 100 is paired with the wireless communication device 200 in advance, when the user carrying the electronic key 100 approaches the vehicle where the wireless communication device 200 is installed after the user moves away from the vehicle by the predetermined distance or longer, the transmission and the reception of the polling signal and the response signal are started. At such a time, the first communication unit 110 of the electronic key 100 may be set to the ON state from the OFF state. In such a case, when the user carrying the electronic key 100 approaches the vehicle where the wireless communication device 200 is installed, and thus the need for the communication function between the electronic key 100 and the vehicle appears, the first communication unit 110 of the electronic key 100 can be automatically set to the ON state from the OFF state.

Effect

In the present embodiment, when the wireless communication device 200 is installed in the vehicle, the communication function between the electronic key 100 and the vehicle can be automatically controlled when the user carrying the electronic key 100 moves across the boundary of the reachable range of the electric wave outside the vehicle, and convenience and security can be further improved.

Second Embodiment

Configuration

Figure 3:
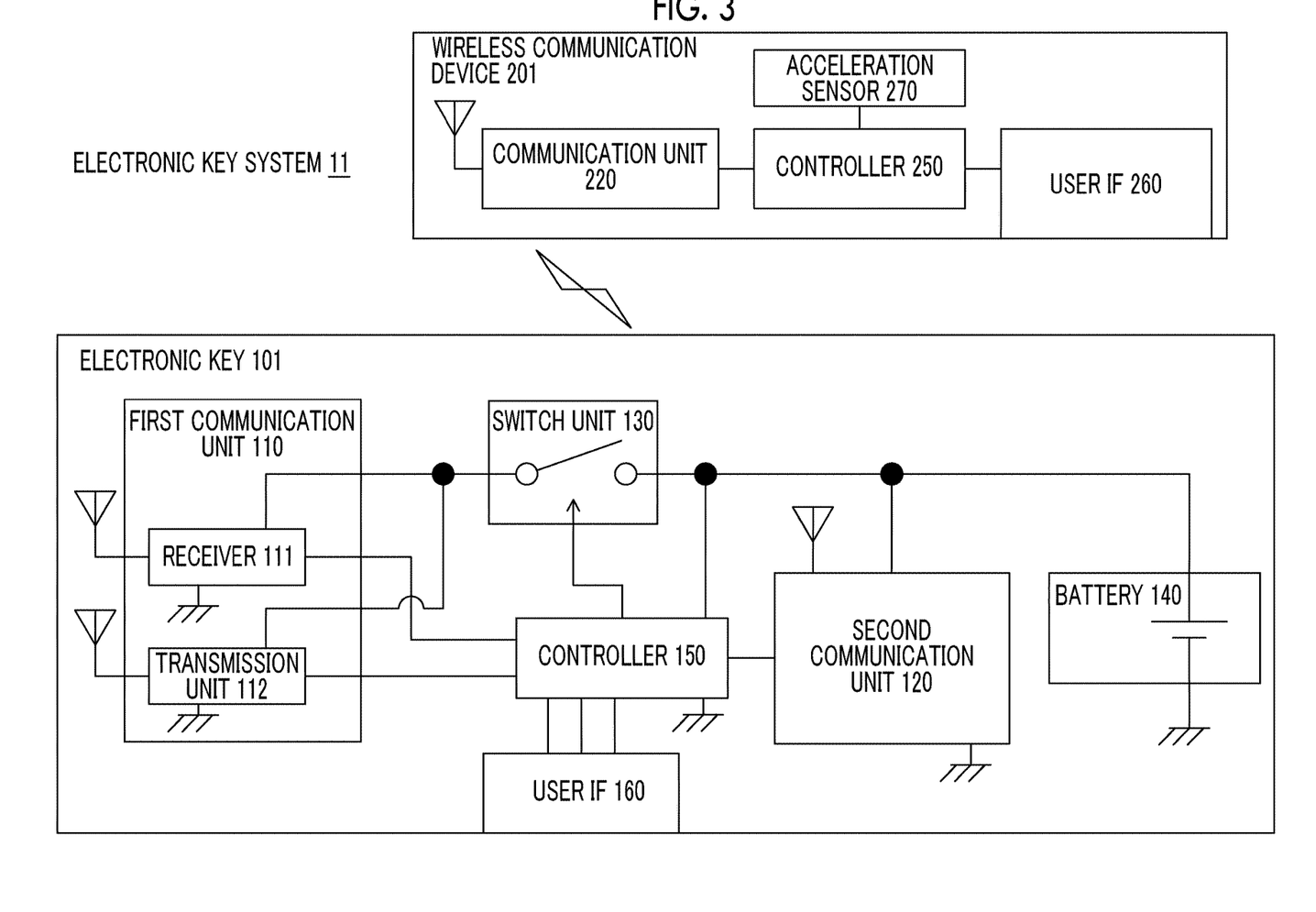
FIG. 3 is a function block diagram of a vehicular electronic key system according to second and third embodiments of the disclosure.

FIG. 3 illustrates a function block diagram of a vehicular electronic key system 11 according to the present embodiment. The vehicular electronic key system 11 includes an electronic key 101 and a wireless communication device 201. The wireless communication device 201 is different from the wireless communication device 200 according to the first embodiment in that the wireless communication device 201 includes an acceleration sensor 270. The same or corresponding elements as in the first embodiment will be designated by the same reference signs, and the description thereof will not be provided.

Operation

Figure 4:
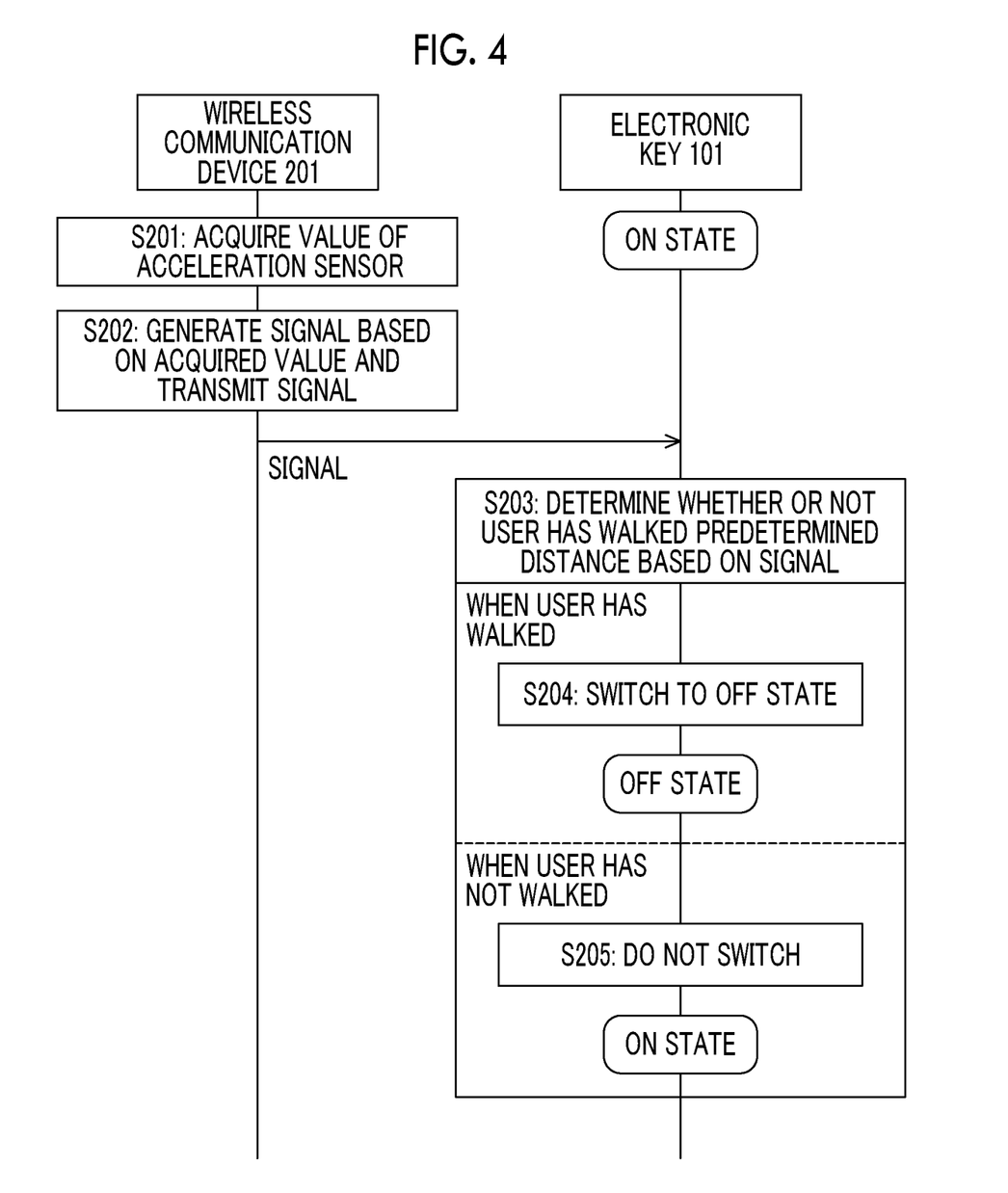
FIG. 4 is an operation sequence diagram of the vehicular electronic key system according to the second embodiment of the disclosure.

In the present embodiment, the wireless communication device 201 is a portable wireless communication terminal device such as a smartphone or a wearable device, and is carried by the user along with the electronic key 101. In the present embodiment, when the controller 150 of the electronic key 101 detects that the user carrying the wireless communication device 201 has walked the predetermined distance or longer based on the output from the acceleration sensor 270, the first communication unit 110 of the electronic key 101 can be set to the OFF state. FIG. 4 illustrates an example of an operation sequence.

Step S201: The controller 250 of the wireless communication device 201 acquires acceleration data that is output by the acceleration sensor 270, and the process proceeds to subsequent step S202.

Step S202: The controller 250 of the wireless communication device 201 generates a signal based on the acceleration data and causes the communication unit 220 to transmit the signal. In the present embodiment as well, communication between the electronic key 101 and the wireless communication device 201 can be performed using a short-range wireless communication standard.

Step S203: The second communication unit 120 of the electronic key 101 receives the signal. The signal includes information indicating the acceleration. For example, the controller 150 of the electronic key 101 determines whether or not the user carrying the wireless communication device 201 has moved the predetermined distance or longer by walking a predetermined number of steps or more. The determination can be performed based on a pattern of change in the direction and magnitude of the acceleration, or the duration of the pattern of change. When the controller 150 determines that the user has moved the predetermined distance or longer, the process proceeds to step S204. When the controller 150 determines that the user has not moved the predetermined distance or longer, the process proceeds to step S205.

Step S204: The controller 150 of the electronic key 101 controls the switch unit 130 to set the first communication unit 110 to the OFF state.

Step S205: The controller 150 of the electronic key 101 maintains the ON state of the first communication unit 110 without setting the first communication unit 110 to the OFF state.

The processes of steps S201 and S202 on the wireless communication device 201 side are periodically performed. Alternatively, after the first communication unit 110 is set to the OFF state, when the controller 150 of the electronic key 101 causes the second communication unit 120 to transmit a signal indicating that the first communication unit 110 has been set to the OFF state, and the communication unit 220 receives the signal, the controller 250 of the wireless communication device 201 may stop executing steps S201 and S202.

In step S203, while the predetermined number of steps used as a reference for determination is not particularly limited, it is desirable to set the number of steps that is not easy or impossible for the user to walk in a limited space within the vehicle. For example, the predetermined number of steps is desirably approximately a few tens of steps. Accordingly, walking of the user after stepping out of the vehicle can be detected. In order to further improve the accuracy of determination, the wireless communication device 201 may further include a sensor such as a global positioning system (GPS) sensor, generate signals based on the output of the plurality of sensors, and use the signals for determination. When the distance, direction, and the like of movement can be detected using various sensors, the sensors may be used for a reference for determination along with the number of steps or instead of the number of steps.

In the above-described example, the case in which the first communication unit 110 of the electronic key 101 is switched from the ON state to the OFF state is described. However, in a case where the first communication unit 110 of the electronic key 101 is in the OFF state, when determination is made that the user has walked the predetermined distance or longer, the first communication unit 110 of the electronic key 101 may be switched from the OFF state to the ON state. In a case where such determination of walking is performed, it is also suitable to use locking of the door of the vehicle as a reference for the start of the determination of walking. The electronic key 101 that performs wireless communication with the vehicle can receive a notification indicating that the door of the vehicle is locked from the vehicle using wireless communication. Thus, when the controller 150 is set to detect walking of the user after the vehicle is locked, the controller 150 can more correctly determine walking of the user after stepping out of the vehicle.

Effect

In the present embodiment, when the user carrying the wireless communication device 201 and the electronic key 101 has moved the predetermined distance or longer outside the vehicle, the communication function between the electronic key 101 and the vehicle can be automatically controlled, and convenience and security can be further improved. An existing device included in the smartphone or the like can be used as a device such as the acceleration sensor.

Third Embodiment

Configuration

Function blocks of a vehicular electronic key system according to the present embodiment are the same as the function blocks of the vehicular electronic key system 11 according to the second embodiment illustrated in FIG. 3 and thus, will be designated by the same reference signs, and the description thereof will not be provided.

Operation

Figure 5:
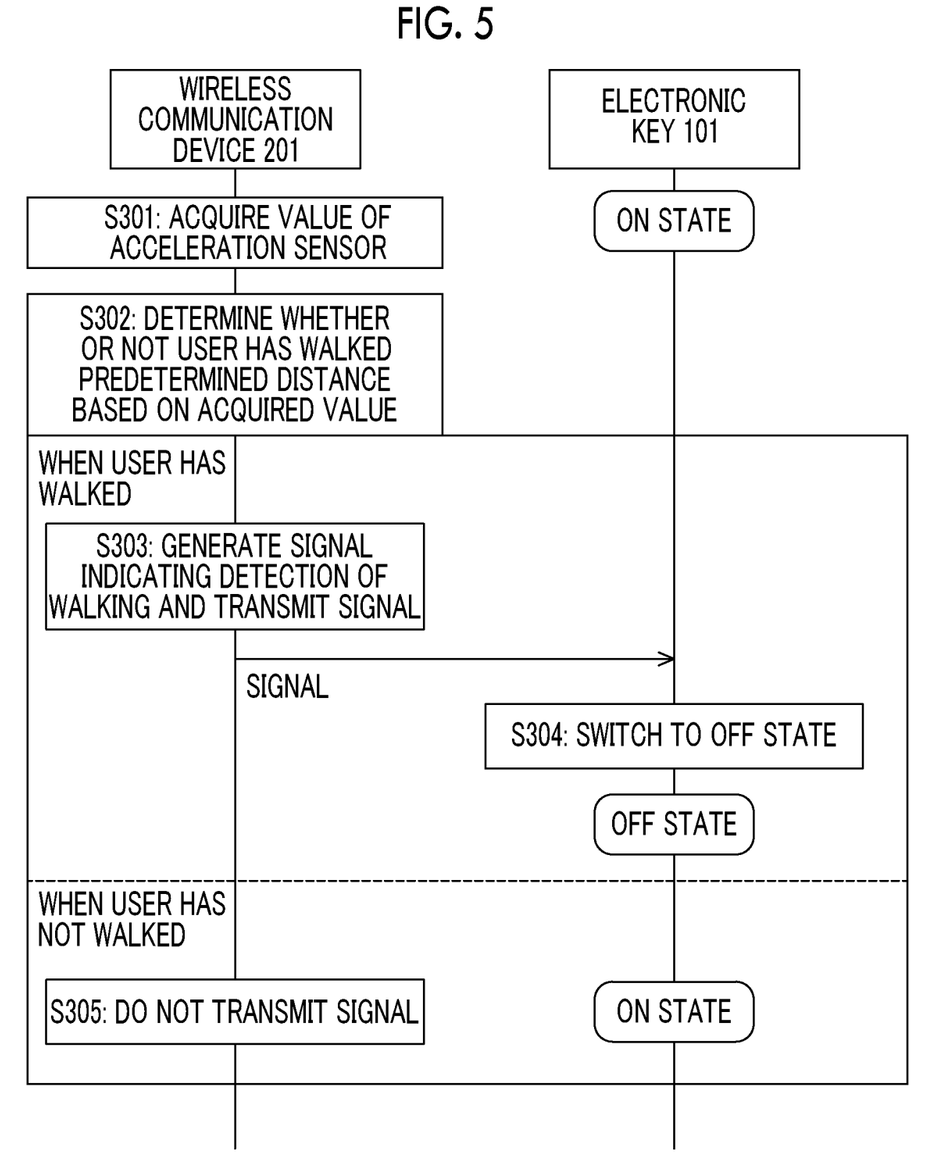
FIG. 5 is an operation sequence diagram of the vehicular electronic key system according to the third embodiment of the disclosure.

In the present embodiment, the wireless communication device 201 is a portable wireless communication terminal device such as a smartphone or a wearable device, and is carried by the user along with the electronic key 101 as in the second embodiment. In the present embodiment, the first communication unit 110 of the electronic key 101 is set to the OFF state when the controller 250 of the wireless communication device 201 detects that the user carrying the wireless communication device 201 has walked the predetermined distance or longer based on the output of the acceleration sensor 270, unlike the second embodiment where the controller 150 of the electronic key 101 determines that the user has walked the predetermined distance or longer. FIG. 5 illustrates an example of an operation sequence.

Step S301: The controller 250 of the wireless communication device 201 acquires the acceleration data output by the acceleration sensor 270, and the process proceeds to subsequent step S302.

Step S302: The controller 250 of the wireless communication device 201 determines whether or not the user carrying the wireless communication device 201 has moved the predetermined distance or longer by walking the predetermined number of steps or more. The determination can be performed based on a pattern of change in the direction and magnitude of the acceleration, or the duration of the pattern of change as in the second embodiment. When the controller 250 determines that the user has moved the predetermined distance or longer, the process proceeds to step S303. When the controller 250 determines that the user has not moved the predetermined distance or longer, the process proceeds to step S305.

Step S303: The controller 250 of the wireless communication device 201 generates a signal indicating that the walking of the user by the predetermined number of steps or more has been detected, and causes the communication unit 220 to transmit the signal. In the present embodiment as well, communication between the electronic key 101 and the wireless communication device 201 can be performed using a short-range wireless communication standard.

Step S304: The second communication unit 120 of the electronic key 101 receives the signal. In response to the signal, the controller 150 of the electronic key 101 controls the switch unit 130 to set the first communication unit 110 to the OFF state.

Step S305: The controller 250 of the wireless communication device 201 does not cause the communication unit 220 to transmit the signal.

The processes of steps S301 to S303 and S305 on the wireless communication device 201 side are periodically performed. Alternatively, after the execution of step S303, the execution of steps S301 to S303 and S305 may be stopped.

In step S302, as in the second embodiment, it is desirable to set, for example, the number of steps corresponding to approximately a few tens of steps of walk as the predetermined number of steps used as a reference for determination. When the distance, direction, and the like of movement can be detected using various sensors, the sensors may be used for a reference for determination along with the number of steps or instead of the number of steps.

In the above-described example, the case in which the first communication unit 110 of the electronic key 101 is switched from the ON state to the OFF state is described. However, in a case where the first communication unit 110 of the electronic key 101 is in the OFF state, when determination is made that the user has walked the predetermined distance or longer, the first communication unit 110 of the electronic key 101 may be switched from the OFF state to the ON state. It is also suitable that, by providing a GPS sensor or the like to the wireless communication device 201, the first communication unit 110 of the electronic key 101 is switched from the ON state to the OFF state when the user moves away from the position where the vehicle has been parked by a certain distance, and conversely is switched from the OFF state to the ON state when the user approaches the vehicle to be within the certain distance from the position where the vehicle has been parked after the user moves away from the position by the certain distance.

Effect

In the present embodiment, as in the second embodiment, when the user carrying the wireless communication device 201 and the electronic key 101 has moved the predetermined distance or longer outside the vehicle, the communication function between the electronic key 101 and the vehicle can be automatically controlled, and convenience and security can be further improved. An existing device included in the smartphone or the like can be used as a device such as the acceleration sensor. Since the process of determining the number of steps or the like is executed on the smartphone side in the present embodiment, an increase in processing load on the small electronic key side having limited resources can be further suppressed.

As described heretofore, in each embodiment of the disclosure, the communication function between the electronic key 100 or 101 and the vehicle can be automatically controlled based on the movement of the user carrying the electronic key 100, or the electronic key 101 and the wireless communication device 201 outside the vehicle without receiving an operation from the user. In each embodiment, additionally, the wireless communication device 200 or 201 may receive an ON operation and an OFF operation from the user and transmit an instruction signal corresponding to the ON operation or the OFF operation to the electronic key 100 or 101, and the electronic key 100 or 101 may control the communication state in response to the received instruction signal. The wireless communication device 200 or 201 may store, in advance, the date and time when switching has to be performed from the ON state to the OFF state, or the date and time when switching has to be performed from the OFF state to the ON state. The wireless communication device 200 or 201 may transmit the instruction signal when the date and time are reached. When the vehicle has a fixed traveling schedule, the communication function between the electronic key 100 or 101 and the vehicle can be controlled by controlling the communication function in accordance with the schedule without an operation being performed by the user whenever the operation is needed.

In the communication between the electronic key 100 or 101 and the wireless communication device 200 or 201, code collation may be performed, and the communication function may be controlled only when the collation has succeeded. The cost of communication, calculation, electric power, and the like may be decreased instead of the decrease in the level of security, by performing the code collation only when the communication function is set to the ON state from the OFF state, and not performing the code collation or decreasing the level of authentication when the communication function is set to the OFF state from the ON state.

The electronic key according to each embodiment heretofore can be manufactured by adding the second communication unit 120 and the switch unit 130 to an existing electronic key. Thus, the second communication unit 120 and the switch unit 130 may be provided by being mounted on a substrate separate from other parts. Accordingly, the electronic key according to each embodiment can be easily manufactured by incorporating the separate substrate in the existing electronic key.

Alternatively, the first communication unit 110 and the second communication unit 120 may be at least partially shared. For example, the receiver 111 of the first communication unit 110 that communicates with the vehicle using an electric wave having a communicable distance of 1 m or shorter may be set as a target for controlling the ON and OFF states of the communication function, and the second communication unit 120 and the transmission unit 112 of the first communication unit 110 that communicates with the vehicle using an electric wave having a communicable distance of 10 m or longer may be shared using the same frequency band. Such sharing enables a decrease in the size and cost of the electronic key 100 or 101.

While the controller 150 of the electronic key 100 or 101 at least partially stops supply of electric power to the first communication unit 110 using the switch unit 130 in each embodiment heretofore, the controller 150 may at least partially stop the communication function instead of stopping supply of electric power.

The disclosure can be perceived as not only a configuration of function blocks of a vehicular electronic key system but also a method executed by a vehicular electronic key system including a processor.

The disclosure is useful for vehicular electronic key systems.

What is claimed is:

1. A vehicular electronic key system comprising:
an electronic key that includes:
a first communication unit configured to perform wireless communication with a vehicle;
a second communication unit configured to perform wireless communicate on with a wireless communication device; and
a first controller configured to:
switch an operating state between an ON state where a function of the first communication unit is operated, and an OFF state where the function of the first communication unit is at least partially stopped, based on a result of communication of the second communication unit with the wireless communication device;
detect whether an electronic key has been moved by a predetermined distance or longer outside the vehicle based on at least a result of communication of the predetermined signal by the second communication unit; and
in response to the electronic key being moved by the predetermined distance or longer outside the vehicle, switch a current state of the operating state.

2. The vehicular electronic key system according to claim 1, wherein the first controller is configured to:
detect that the electronic key has been moved a distance equal to or longer than a predetermined distance when the second communication unit does not receive an electric wave from the wireless communication device.

3. The vehicular electronic key system according to claim 1, wherein
the wireless communication device is a portable wireless communication terminal device that includes an acceleration sensor,
the second communication unit receives a signal from the wireless communication device, the signal including information on an output of the acceleration sensor, and
the first controller detects that the electronic key has been moved a distance equal to or longer than a predetermined distance based on the information based on the output of the acceleration sensor.

4. The vehicular electronic key system according to claim 3, wherein the first controller is configured to:
generate a signal when the electronic key is determined as having traveled the predetermined distance or longer; and
set the operating state to the OFF state when the second communication unit receives the predetermined signal.

5. A vehicular electronic key system comprising:
an electronic key that includes:
a first transmitter/receiver configured to perform wireless communication with a vehicle;
a second transmitter/receiver configured to perform wireless communication with a wireless communication device; and
a processor programmed to:
switch an operating state between: (i) an ON state where a function of the first transmitter/receiver is operated, and (ii) an OFF state where the function of the first transmitter/receiver is at least partially stopped, based on a result of communication of the second transmitter/receiver with the wireless communication device;

detect whether an electronic key has been moved by a predetermined distance or longer outside the vehicle based on at least a result of communication of the predetermined signal by the second transmitter/receiver; and in response to the electronic key being moved by the predetermined distance or longer outside the vehicle, switch a current state of the operating state.

6. The vehicular electronic key system according to claim 5, wherein the processor is programmed to:

detect that the electronic key has been moved a distance equal to or longer than a predetermined distance when the second transmitter/receiver does not receive an electric wave from the wireless communication device.

7. The vehicular electronic key system according to claim 5, wherein the wireless communication device is a portable wireless communication terminal device that includes an acceleration sensor, the second transmitter/receiver receives a signal from the wireless communication device, the signal including information on an output of the acceleration sensor, and the processor determines that the electronic key has been moved a distance equal to or longer than a predetermined distance based on the information based on the output of the acceleration sensor.

8. The vehicular electronic key system according to claim 7, wherein the processor is programmed to:

generate a signal when the electronic key is determined as having traveled the predetermined distance or longer; and set the operating state to the OFF state when the second transmitter/receiver receives the predetermined signal.

9. A method for controlling an electronic key and a wireless communication device in a vehicular electronic key system having a processor, the method comprising:

performing, by a first transmitter/receiver in the electronic key, wireless communication with a vehicle;

performing, by a second transmitter/receiver in the electronic key, wireless communication with a wireless communication device; and detecting, by a processor in the electronic key, whether the electronic key has been moved by a predetermined distance or longer outside the vehicle based on at least a result of communication of the predetermined signal by the second transmitter/receiver; and in response to the electronic key being moved by the predetermined distance or longer outside the vehicle, switching, by the processor in the electronic key, a current state of an operating state between: (i) an ON state where a function of the first transmitter/receiver is operated, or (ii) an OFF state where the function of the first transmitter/receiver is at least partially stopped.

10. The method according to claim 9, further comprising:

detecting, by the processor, that the electronic key has been moved a distance equal to or longer than a predetermined distance when the second transmitter/receiver does not receive an electric wave from the wireless communication device.

11. The method according to claim 9, wherein the wireless communication device is a portable wireless communication terminal device that includes an acceleration sensor, the second transmitter/receiver receives a signal from the wireless communication device, the signal including information on an output of the acceleration sensor.

12. The method according to claim 11, further comprising:

determining, by the processor, that the electronic key has been moved a distance equal to or longer than a predetermined distance based on the information based on the output of the acceleration sensor.

13. The method according to claim 12, wherein the processor is programmed to:

generate a signal when the electronic key is determined as having traveled the predetermined distance or longer; and set the operating state to the OFF state when the second transmitter/receiver receives the predetermined signal.

* * * * *